Oct. 5, 1965    W. E. WOLSTENHOLME ETAL    3,209,585
AUTOGRAPHIC IMPACT TESTER
Filed April 10, 1962    2 Sheets-Sheet 2
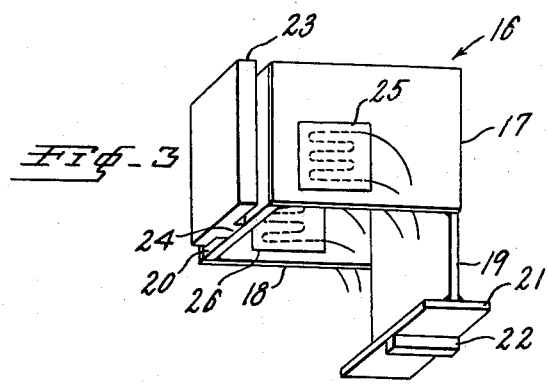
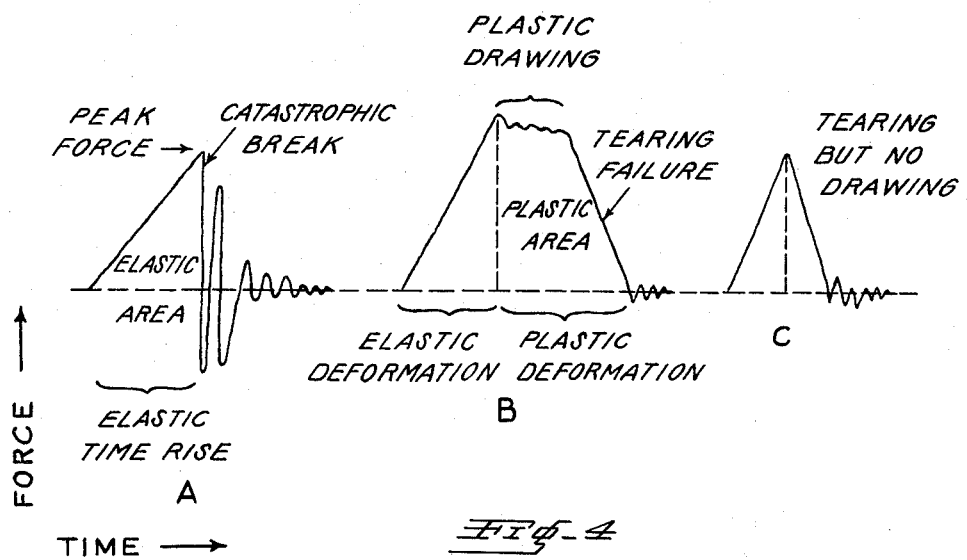
INVENTORS
William E. Wolstenholme
Rafael Glück
BY
Charles A. Blank
ATTORNEY 
United States Patent Office 3,209,585
Patented Oct. 5, 1965

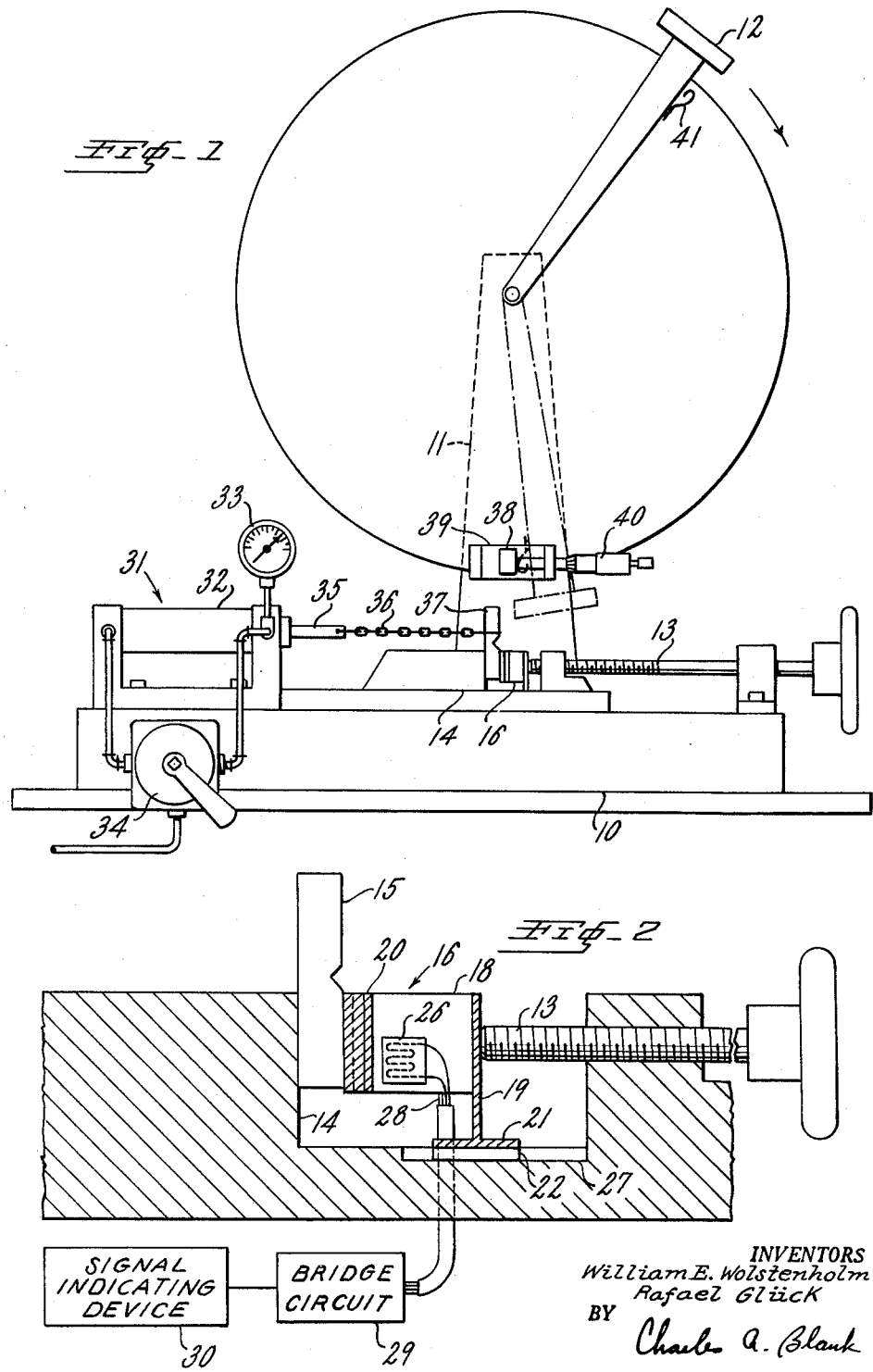

3,209,585
AUTOGRAPHIC IMPACT TESTER
William E. Wolstenholme, Wayne, N.J., and Rafael Glück, West Lafayette, Ind., assignors to United States Rubber Company, New York, N.Y., a corporation of New Jersey
Filed Apr. 10, 1962, Ser. No. 186,392
9 Claims. (Cl. 73—101)

This invention relates to impact testing machines. More particularly, the invention relates to strain gage transducers useful with impact testing machines for providing photographic records of the force-time behavior of a test specimen as the specimen bends and breaks upon impact.

Heretofore, a conventional Izod, or cantilever beam, impact testing machine has been used to determine the impact strength, measured as the total kinetic energy, in foot-pounds, used by the pendulum hammer to flexurally break a test sample such as a plastic, metal, or glass specimen. However, impact characteristics of two materials which show equivalent flexural impact strengths do exhibit marked differences in their breaking behavior. This fact was recognized in regard to the stress-strain characteristics exhibited during the tensile impact breaking of a sample under tension, and a prior machine was devised to record the characteristics of a sample breaking under tensile impact.

Because of the nature of the test conditions required during the flexural bending and breaking of a sample, it is impossible to utilize the above-mentioned prior machine to make flexural impact tests, and thus it has previously been impossible to obtain a uniformly accurate force-time record on samples broken by flexural impact.

Therefore an object of this invention is to provide a device which produces uniform photographic records of the force-time behavior during the flexural bending and breaking of a test sample.

A further object is to provide a new strain gage transducer which will give uniform and accurate results of the magnitude of the force and yielding when subjected to repeated and heavy blows.

The above and other objects in the instant invention will be further understood in the following description when read in conjunction with the accompanying drawings, wherein:

FIG. 1 is a side elevational view of a device constructed in accordance with the invention.

FIG. 2 is a sectional view of the FIG. 1 device showing the relative position of the parts prior to and during impact.

FIG. 3 is a perspective view of the specific strain gage transducer used in the FIG. 1 device.

FIG. 4 is a force-time graph showing the different kinds of impulse curves which may be obtained from various materials tested by the device of FIG. 1.

To illustrate the invention, a portion of a standard Izod, or cantilever beam, impact machine is shown in FIGS. 1 and 2, wherein a base portion is represented by numeral 10. Supported by base 10 are frame 11, hammer 12, clamping screw 13 and anvil 14. In the prior operation of an Izod machine, a sample was supported in the machine between the anvil 14 and the clamping screw 13, and a breaking blow was delivered to the sample by hammer 12. Suitable calculations were then made to obtain the total breaking energy absorbed by the sample from the impact.

Our invention involves the use of the above described impact testing machine in combination with strain gage transducer 16, located in the anvil of the impact testing machine as shown in FIGS. 1 and 2.

Referring to FIG. 3, transducer 16 is a four-sided structure having sides 17, 18, 19 and 20. Side 19 has a foot portion projecting therefrom, plate 21 is welded to the foot portion, and positioning key 22 is welded to the plate. A distribution plate 23 is centered and welded to side 20 by web portion 24. Side 17 overlaps the adjacent ends of sides 19 and 20 and has strain gage 25 attached to the outside thereof and a second strain gage (not shown) attached to the inside thereof. Likewise, side 18 overlaps the adjacent ends of sides 19 and 20 and has strain gage 26 attached to the inside portion thereof and a second strain gage (not shown) attached to the outside thereof.

In operation, transducer 16 is accurately positioned in the device by placing key 22 in slot 27 machined in the base portion of anvil 14. A test sample 15 is then placed in position against the side of anvil 14, and clamping screw 13 is tightened against side 19 to force plate 23 firmly against the sample.

The purpose of plate 23 is to insure that a constant area distributes the force of the impact from the sample to the transducer frame 16. We had found by experiment that with samples of different width the mechanical deflection characteristic of the frame 16 was not identical for the same force applied at the impact point. This required separate calibrations for changes in sample size. The short thick web of the distribution plate and the relatively heavy support plate were devised to provide a constant area for transmission of the force developed by the sample in contact with the distribution plate. This permits the testing of samples from .090 inch to over .500 inch in width (the length or vertical dimension remains constant) with the same calibration, within experimental error. There are other possible mechanical constructions that would possibly be effective, for example, making side 20 very thick. The deflection of sides 17 and 18 would decrease as side 20 increases in thickness, and the sensitivity would drop.

With sample 15 firmly clamped between anvil 14 and distribution plate 23, hammer 12 is released and swings downwardly to deliver a breaking blow to sample 15. As the sample bends elastically under the impact, then yields and breaks, the flexural forces are transmitted to transducer 16. Because of the structural arrangement of the sides with sides 17 and 18 overlapping the ends of sides 19 and 20, sides 17 and 18 uniformly bow outwardly upon impact. The strain gages on the inside of the transducer are thus placed in compression and the strain gages on the outside are placed in tension.

As can be seen in FIG. 2, the leads 28 of the strain gages are connected to the arms of an alternating bridge circuit 29 which is in turn connected to a signal-indicating oscilloscope 30. The alternating current bridge and oscilloscope circuits are of a standard commercial type. Such systems are described in standard reference textbooks on electronic measuring devices and in commercial brochures such as a publication of the Tektronix Corporation, of Portland, Oregon, entitled "Type Q Transducer and Strain Gauge Plug-In Unit."

Although the strain gauge response may be calibrated in various independent ways, we have provided a calibrating system which is illustrated generally at 31 in FIG. 1. Air cylinder 32 is supplied with air at various controlled pressures as determined by a regulator (not shown) and gage 33. The piston is double acting, and admittance or exhaustion of air to and from the piston is controlled by the four-way valve 34. The base of the piston is bolted to the base of the impact tester so that the travel of the piston is in direct line with the point on a sample at which the pendulum hammer strikes the sample. The piston rod 35 is connected by a light metal chain 36 to a dummy steel sample 37 of identical size as a standard sample.

Calibration procedure is as follows: The dummy steel sample, with chain attached to piston, is mounted in the anvil with the transducer 16. Electrical power for strain gages and oscilloscpoe is turned on, and the air pressure is adjusted to a convenient value, say 5 pounds per square inch. From knowledge of the piston area and the pressure, the absolute force acting on dummy sample at the point which is normally struck by the impact blow can be easily computed. Adjustments are made so that the oscilloscope spot moves over a convenient number of divisions on the oscilloscpoe reticule when the piston moves to tighten the chain and thus to deflect the transducer. Photographs are made of the oscilloscope trace for a series of pressures from, say 5 to 60 pounds per square inch, at desired intervals. The length of the trace for each pressure is measured, and a calibration graph is plotted of force, as calculated from air pressure and piston area, versus the length of the trace on the photographs. A smooth line connecting the points then provides a calibration curve that will relate the height of a pulse due to deflection of the transducer to the force required to produce this deflection. Calibration tests are made at the beginning of each test run (some test runs contain as many as 30 to 50 samples).

A triggering mechanism for activating the sweep axis of the oscilloscope is provided. The mechanism uses the motion of the pendulum to make an electrical contact just before the hammer strikes the sample. A brass stud 38 is mounted on an insulating frame 39 attached to the frame 11 that supports the hammer 12. The position of the brass stud is controlled by the micrometer 40. On the hammer arm the light spring 41 is fastened in a position such that the spring will contact the stud before the hammer hits the samples. The electrical circuit, comprising the metallic frame of the tester, an insulated wire from the brass stud, and a small battery, sends an activating pulse to the trigger circuit of the oscilloscope to start the horizontal time axis of the oscilloscope sweep just prior to the time the hammer strikes and begins to deflect the sample. This position of the hammer is shown in phantom in FIG. 1. The impact deflects the transducer, producing an electrical unbalance in the strain gage bridge that in turn produces a vertical deflection of the horizontal trace. Since these events occur in very short times, of the order of $10^{-5}$ to $10^{-3}$ seconds, the micrometer adjustment was found necessary to achieve satisfactory setting of the trigger. There are many other methods for achieving a trigger signal.

In operation, one or more trial samples are broken and observed visually to enable the operator to properly position the trace and adjust the horizontal sweep timing and the vertical amplification. After proper adjustments the transducer and sample are clamped as shown in FIG. 2, a camera (not shown) is attached to the oscilloscope, and the hammer is reset for release. The camera is set on "bulb" position. When the operator presses the pendulum release with one hand, the other hand simultaneously presses the camera release cable. The camera shutter is held open until the operator releases the cable. In actual practice, the operator closes the camera shutter by the cable release immediately after the hammer has broken the sample. These actions are relatively easy after some coordination trials. All of the above actions could be made fully automatic by using automatic camera activation that would be timed electric circuits energized by the hammer fall. After developing the positive print, the operator records on the back of the print the oscilloscope dial setting, sample number, dimensions, and the impact strength read from the base dial of the impact tester. By use of the calibrated force constant, with appropriate oscilloscope amplification data, the value of the peak force is computed and tabulated. In addition tabulation is made of the elastic rise time, the plastic time, and the elastic, plastic and total impulse energies.

The force-time graphs of FIG. 4 represent the various force-time photographs for the three general types of impulse curve. The first type (A in FIG. 4) reveals that the sample deforms uniformly under the impacting blow until the peak force is reached, then the sample yields and breaks catastrophically, as indicated by the force abruptly falling to zero. The variations shown in this sketch arise from mechanical vibrations of the transducer and are referred to as "ringing" of the transducer. The second type of break (B in FIG. 4) shows that the sample undergoes some plastic drawing at constant force after it has yielded, and then the sample shows tearing, as indicated by graduated decay to zero; otherwise the force would drop to zero within one-quarter period of the transducer mechanical ringing time. The third type of break (C in FIG. 4) shows tearing after yielding, but no intervening plastic drawing. The total area under a force-time curve is the momentum change, or the impulse absorbed during the breaking of the sample. This impulse, calculated from force-time photographs, has been found to correlate with the total breaking energy measured and recorded as impact strength, for all the types of breaking behavior illustrated by the impulse curves of FIG. 4 and various other combinations of these curves.

It is self-evident that the photographs from the autographic impact test give new information on the impact breaking behavior that cannot be obtained from the prior standard impact strength test. Also, since the area under the force-time, or impulse, curve correlates with the value of the standard impact strength, the relative amounts of breaking energy required for elastic bending can be compared with the relative amounts of breaking energy absorbed after yielding or in the plastic region. Our impulse photographs show that high impact thermoplastics dissipate approximately 70% of their total breaking energy after yielding.

While there has been desuribed what is at present believed to be the preferred embodiment of this invention, various changes and modifications within the scope of the invention may be made therein as will be apparent to those skilled in the art, and the scope of the invention is defined in the claims.

Having thus described our invention, what we claim and desire to protect by Letters Patent is:

1. An impact testing instrument comprising a base, a clamping means including a fixed abutment secured to said base and movable member mounted on said base for movement toward and away from said fixed abutment, a transducer disposed between said abutment and said movable member and adapted to support a test sample against said abutment when held against said sample by said movable member, said transducer having a first and a second pair of opposed sides, said sides being secured together to form a hollow, substantially rectangular box with said first pair of sides overlapping said second pair of sides, strain gauges secured to an inside portion and an outside portion of each side of said first pair of opposed sides, and means for applying an impact force to a clamped side of said sample while said sample is clamped at a predetermined pressure between said abutment and the outer face of one of said second pair of opposed sides, said strain gauges being responsive to the deflection of said first pair of sides caused by the reaction force developed by the flexural bending and breaking of said sample and providing a signal representative of the impulse absorbed by said sample.

2. The instrument of claim 1 wherein said transducer further comprises a distribution plate affixed by a web portion centrally of and in a plane substantially parallel to said outer face and adapted to contact such sample when said sample is clamped between said fixed abutment and said transducer.

3. The instrument of claim 1 wherein said sides of said first pair of opposed sides have a thickness equal to 25% to 75% of the thickness of the sides of said second pair of opposed sides.

4. The instrument of claim 1 further comprising means for supporting and positioning said transducer on said base intermediate said fixed abutment and said movable member.

5. The instrument of claim 4 wherein said transducer supporting and positioning means comprises a foot portion extending from the other side of said second pair of opposed sides, a plate integral with said foot portion and disposed in a plane perpendicular to said foot portion, and a key integral with said plate.

6. The instrument of claim 1 further comprising means responsive to said signal and adapted to record said signal.

7. A transducer comprising a hollow, four-sided, substantially rectangular box having a first pair and a second pair of opposed sides, wherein the thickness of each side of the first pair of opposed sides is equal to 25% to 75% of the thickness of each side of the second pair of opposed sides, said box being constructed so that said first pair of opposed sides overlap the ends of said second pair of opposed sides, strain gauges secured to an inside portion and an outside portion of each side of said first pair of opposed sides, a distribution plate disposed in a plane substantially parallel to and centrally of one of the sides of said second pair of opposed sides, and a web connecting said plate to an outside portion of said one side.

8. A transducer comprising a hollow, four-sided, substantially rectangular box having a first pair and a second pair of opposed sides, said box being constructed so that said first pair of opposed sides overlap the ends of said second pair of opposed sides, strain gauges secured to an inside portion and an outside portion of each side of said first pair of opposed sides, a distribution plate disposed in a plane substantially parallel to and centrally of one of the sides of said second pair of opposed sides, a web connecting said plate to an outside portion of said one side, a foot portion extending from the other of the sides of said second pair of opposed sides, a support plate integral with said foot portion and disposed substantially perpendicularly to said portion, and a key integral with said plate.

9. An impact testing instrument comprising a base, a clamping means including a fixed abutment secured to said base and a movable member mounted on said base for movement toward and away from said fixed abutment, a transducer disposed between said abutment and said movable member and adapted to support a test sample against said abutment when held against said sample by said movable member, said transducer having a first and a second pair of opposed sides, said sides being secured together to form a hollow, substantially rectangular box, a distribution plate affixed by a web portion centrally of and in a plane substantially parallel to an outer face of one of said second pair of opposed sides, strain gauges secured to an inside portion and an outside portion of each side of said first pair of opposed sides, and means for applying an impact force to a clamped side of said sample while said sample is clamped at a predetermined pressure between said abutment and said distribution plate, said strain gauges being responsive instantaneously to the reaction force developed during the flexible impact of said test sample when said test sample is clamped between said abutment and said distribution plate and is subjected to said impact force, the said reaction force of said sample against said distribution plate producing an outward deflection in each of the said first pair of opposed sides of said transducer, said deflection causing in said strain gauges an instantaneous electrical imbalance, and said electrical imbalance producing a transient signal proportional to the said reaction force.

References Cited by the Examiner

UNITED STATES PATENTS

| 2,359,044 | 9/44 | MacBride | 73—101 |
| 2,362,589 | 11/44 | Simmons | 73—89 |
| 2,475,614 | 7/49 | Hoppmann et al. | 73—12 |
| 2,582,886 | 1/52 | Ruge | 73—141 |
| 2,849,048 | 8/58 | Curtner | 73—89 X |
| 3,057,202 | 10/62 | Dumas | 73—398 |

OTHER REFERENCES

Hoffmann, 1,067,241, Oct. 15, 1959 (German Patent Application).

RICHARD C. QUEISSER, *Primary Examiner*.

ROBERT L. EVANS, JOSEPH P. STRIZAK, *Examiners*.